(12) United States Patent
Mallat

(10) Patent No.: US 8,189,939 B2
(45) Date of Patent: May 29, 2012

(54) METHOD AND APPARATUS FOR ENHANCING SIGNALS WITH MULTISCALE GROUPING BANDELETS

(75) Inventor: Stephane Mallat, Paris (FR)

(73) Assignee: Zoran France, Malakoff (FR)

( * ) Notice: Subject to any disclaimer, the term of this patent is extended or adjusted under 35 U.S.C. 154(b) by 856 days.

(21) Appl. No.: 12/094,813

(22) PCT Filed: Nov. 25, 2005

(86) PCT No.: PCT/EP2005/013536
§ 371 (c)(1),
(2), (4) Date: Nov. 24, 2008

(87) PCT Pub. No.: WO2007/059795
PCT Pub. Date: May 31, 2007

(65) Prior Publication Data
US 2009/0175552 A1    Jul. 9, 2009

(51) Int. Cl.
*G06K 9/40* (2006.01)
*G06T 5/00* (2006.01)

(52) U.S. Cl. ............... 382/254; 382/260; 382/109

(58) Field of Classification Search ............ 382/254, 382/109, 260, 264; 348/607
See application file for complete search history.

(56) References Cited

U.S. PATENT DOCUMENTS

| | | | |
|---|---|---|---|
| 6,879,729 B2 * | 4/2005 | Kamath et al. | 382/254 |
| 2003/0031369 A1 | 2/2003 | Le Pennec et al. | |
| 2004/0071363 A1 * | 4/2004 | Kouri et al. | 382/276 |
| 2005/0259889 A1 * | 11/2005 | Ferrari et al. | 382/275 |

OTHER PUBLICATIONS

Pennec et al. "Sparse Geometric Image Representations With Bandelets." IEEE Transactions on Image Processing, vol. 14, No. 4, Apr. 2005, pp. 423-438.*
Peyre et al. "Discrete Bandelets With Geometric Orthogonal Filters." IEEE International Conference on Image Processing, vol. 1, Sep. 2005, 4 pages.*

* cited by examiner

*Primary Examiner* — Jon Chang
(74) *Attorney, Agent, or Firm* — Lando & Anastasi, LLP

(57) ABSTRACT

A method and apparatus for enhancing a d-dimensional digital signal by taking advantage of regular geometrical structures. The invention comprises a multiscale redundant grouping lifting (102), which iteratively computes grouping arrays and bandelet signals with a redundant grouping lifting. A second step makes an enhancement (103) of bandelet signals. A third step is an inverse multiscale redundant grouping lifting (104) which iteratively updates an enhanced average signal with an inverse redundant grouping lifting that takes in input enhanced bandelet signals. It outputs an enhanced signal. The invention also comprises a subband grouping bandelet enhancement which incorporates a subband decomposition and reconstruction. It includes a super-resolution process which increases the signal resolution by computing an output enhanced signal on an output sampling grid that is larger than the input sampling grid. It also includes restoration systems that invert degradation operators with grouping bandelet enhancements.

21 Claims, 9 Drawing Sheets

METHOD AND APPARATUS FOR ENHANCING SIGNALS WITH MULTISCALE GROUPING BANDELETS

CROSS-REFERENCE TO RELATED APPLICATIONS

This application is being filed as a U.S. National Stage under 35 U.S.C. 371 of International Application No. PCT/EP2005/013536, filed on Nov. 25, 2005, the content of which is hereby incorporated by reference in its entirety.

BACKGROUND OF INVENTION

The invention relates generally to a d-dimensional signal enhancement method, apparatus and computer program, and in particular to a method, apparatus and computer program useful for enhancing d-dimensional signals. Sounds are examples of one-dimensional signals, images are examples of two-dimensional signals. Three-dimensional signals may correspond to video sequences or to three-dimensional block of data such as seismic data or medical imaging data. Signal enhancement includes enhancing the signal resolution with a super-resolution process and enhancing the signal values with a signal restoration. Enhancement is different from compression which either maintains or degrades the signal values in order to construct a compact binary code.

Signal restoration is a process that takes an input digital signal and improves the signal values by removing noise components and by suppressing existing distortions introduced by some prior transformation or degradation process such as a blurring or a signal compression process. Sharpening the signal by removing a blur is a signal restoration as well as a removal of compression artifacts or any additive noise. In seismic signal processing, restoring the reflectivity values from measured seismic data is an another example of signal restoration. Signal super-resolution is a process that improves the signal resolution by adding new sample values to the input signal. This is performed by refining the signal sampling grid and estimating the new signal sample values. An image zooming that increases the image size by refining the image sampling grid is a super-resolution process. For video sequences, deinterlacing processes are also super-resolution processes. Interlaced images include only either the odd or the even rows of the full image. A deinterlacing is a super-resolution process which refines the sampling grid by adding the missing even or odd rows of samples for each interlaced image. Super-resolution for video sequences may also be a scaling that increases the size of each spatial image by adding more pixels (samples). Conversion of standard television images (PAL or NTSC) to high definition television standard includes such a scaling. A restoration process often needs to be integrated with a super-resolution process to improve the signal resolution while removing noises and distortions.

Signal restoration and super-resolution take advantage of a signal regularity. If the input signal values have regular variations, additive noise can be suppressed with a local averaging. Similarly, new sample values can be calculated with a local interpolation. Linear estimators as well as linear interpolations have been thoroughly studied and used in signal processing. Yet, these processes introduce large errors in the neighborhood of sharp transitions such as image edges. Non-linear restoration processes have been introduced to adapt the local averaging to the local signal regularity. Redundant wavelet thresholding processes are examples of such efficient non-linear estimators as described in D. Donoho and I. Johnstone, "Ideal spatial adaptation via wavelet shrinkage," Biometrika, vol. 81, pp. 425-455, December 1994. For multidimensional signals, wavelet procedures do not take advantage of existing geometrical signal regularity. Sparse spike inversion is another example of non-linear signal restoration procedure used for seismic signal processing to restore the spikes of the reflectivity by minimizing the $1^1$ norm of the restored signal. However, such procedures do not either take advantage of existing geometric signal regularity in the seismic data.

A multidimensional signal may have locally a sharp transition in one-direction while varying regularly in another direction. Taking advantage of such anisotropic geometric regularity is at the core of geometric enhancement processes. For video sequences, motion compensation processes are examples of anisotropic geometric regularization in time. Linear restoration processes with motion compensation have been used to suppress noise from video sequences, with a time regularization performed with a linear filter. Such a linear filter blurs the sharp time transitions of the video. To limit this blurring the linear filter often has an impulse response with a fast decay which limits the averaging and hence limits the noise removal. To remove more noise by taking advantage of the signal regularity over large domains while preserving sharp transitions requires to use an adaptive non-linear regularization. Such adaptive restorations can be implemented with wavelet transforms.

Motion compensated wavelet transforms have been used to compress video sequences with lifting transformations along motion threads as in U.S. Pat. No. 6,782,051. Motion threads are obtained by following the motion in time. However, the purpose of these lifting schemes is to compress and not to enhance the signal. As a consequence critically sampled lifting schemes are used, to decompose the signal with a non-redundant lifting. Redundant lifting that compute over-sampled transformations are more efficient for signal enhancement.

To restore sharp signal transitions, a super-resolution process can also use anisotropic signal geometric regularity. Adaptive interpolations can be calculated in the directions in which

SUMMARY OF THE INVENTION

It is a primary object of this invention to devise a method and means to enhance d-dimensional digital signals by taking advantage of the regularity of their geometrical structures with bandelet coefficients calculated with a flexible multi-scale geometric grouping. Multiscale groupings are not necessarily parallel, do not require any segmentation and are well adapted to corners and junctions. For super-resolution, multi-scale grouping bandelets are computed on an output sampling grid that is larger than the input sampling grid of the input signal. The signal enhancement includes a signal restoration which removes distortions and noise with an enhancement process applied to bandelet coefficients.

The invention provides an incoming signal that has sample values associated to points of a d-dimensional input sampling grid, d being an integer at least equal to 1. The invention computes an enhanced signal on a d-dimensional output sampling grid. An ordering is defined between the points of the output sampling grid. Following this order any point is "before" or "after" another point of the output sampling grid. An average signal defined on the output sampling grid is calculated with a sampling grid adjustment. Its value on a sampling point that is in the input sampling grid is equal to the incoming signal value and its value on other points is undefined.

The invention includes a multiscale redundant grouping lifting applied on the average signal. It is implemented by iteratively increasing a scale parameter, and for each scale deriving a grouping array, where this grouping array associates to each sample of the average signal a match sample located before with respect to the ordering of points of the output sampling grid. For each scale, it also updates the average signal and derives a bandelet signal with a redundant grouping lifting.

The invention also includes a step of computing an enhanced bandelet signal at each scale and an enhanced average signal with an enhancement process applied to the bandelet signal at each scale and to the average signal obtained at the end of the last iteration of the previous step.

The invention also includes an inverse multiscale redundant grouping lifting, which is implemented by iteratively decreasing a scale parameter, and for each scale updating the enhanced average signal with an inverse redundant grouping lifting that takes in input an enhanced bandelet signal at this scale. The enhanced average signal derived at the end of this iteration is the enhanced digital signal. These different steps that transform of an incoming signal into an enhanced digital signal are called a grouping bandelet enhancement.

A redundant grouping lifting updates the values of the average signal and at each scale computes a new bandelet signal defined on the same output sampling grid. It thus multiplies by two the number of samples. This redundancy improves the signal enhancement. To minimize the number of operations, the redundant grouping lifting can update the average-signal and derive a bandelet signal with averages and differences of pairs of average signal samples associated by a grouping array.

The sampling grid adjustment step of the invention can output a weight array defined on the output sampling grid, whose values indicate points of the output sampling grid that are not in the input sampling grid. The redundant grouping lifting of the invention then computes averages and differences according to this weight array values. The weight array values is also adjusted by the redundant grouping lifting. In an exemplary embodiment weights of points associated by the grouping array are added.

The redundant grouping lifting can also compute averages and differences that are normalized by the weight array values. With this normalization the bandelet signal values are inner products of the incoming signals with bandelets of unit norm, which improves the stability of the multiscale redundant grouping lifting transform. This is particularly important for noise removal.

At each scale, the grouping array associates points by pairs and allows several points to be grouped with a single one for junctions or meeting points. Any state of the art procedure may be used to compute such a grouping array. In an exemplary embodiment described herein, at each scale a grouping array is derived from a previous scale grouping array with a block matching. The block matching computes a distance of blocks of average signal samples in the neighborhoods of pairs of points, and associates points which minimize this distance. For video sequences, computing a grouping array may correspond to computing displacements in time of points.

The present invention includes a bandelet enhancement process that enhances bandelet signals to remove noise and amplify some signal components. In an exemplary embodiment, this enhancement process includes thresholdings. A thresholding sets to zero the smallest coefficients mostly dominated by the noise and hence removes parts of the noise. Thresholding bandelet coefficients performs an adaptive averaging with multiscale groupings, as long as the signal variations are dominated by the noise. This non-linear thresholding preserves sharp signal transitions.

In super-resolution processing, the output sampling grid is strictly larger than the input sampling grid. Deinterlacing an interlaced video signal is an example of super-resolution processing wherein the input sampling grid is an interlaced video grid and the output sampling grid is a progressive grid. The output enhanced signal is a deinterlaced video signal defined on the progressive grid.

Prior to the multiscale redundant grouping lifting the invention can also include a step decomposing an input digital signal into subband signals. These subband signals correspond to incoming signals, each of which are enhanced by the grouping bandelet enhancement of the present invention, which outputs an enhanced subband signal. An output enhanced signal is then reconstructed from these enhanced subband signals. These different steps that transform, of an input signal into an enhanced digital signal with a subband decomposition and grouping bandelet enhancements define a subband grouping bandelet enhancement.

In video sequences, if the subband decomposition is performed in space for each spatial image and if the grouping bandelet enhancement is performed in time with groupings that relates images points at different time, then the resulting bandelet signal values are inner product of the input video with a spatio-temporal bandelet whose elongation in time follows the time groupings. Thresholding such bandelet signal values performs an adaptive signal regularization simultaneously in space and time. The subband decomposition can be chosen to be a wavelet decomposition. Wavelets are particular well adapted to remove noise from piecewise regular signals and preserve sharp transitions.

The present invention includes a restoration procedure that inverts degradations produced by operators such as convolution operators. In an exemplary embodiment, the incoming signal is computed as the output of an approximate inverse degradation operator applied to an input signal. This approximate inverse often amplifies the noise that is then removed with the grouping bandelet enhancement of the present invention or with the subband grouping bandelet enhancement of the present invention.

The present invention also includes a method for enhancing a plurality of input signals. The method includes the steps of initializing a plurality of updated signals with the plurality of input signals and iteratively computing a plurality of incoming signals by transforming each of this plurality of updated signals with a restoration operator. It derives a plurality of enhanced signals with the grouping bandelet enhancement of the present invention or with the subband grouping bandelet enhancement of the present invention. A plurality of output signals is derived from this plurality of enhanced signals when an iteration criteria is met. Otherwise the method updates the plurality of updated signals with this plurality of enhanced signals. This method applies to improve seismic signal processing for single stack or multistack sparse inversion for a plurality of input signals that are single stack or multiple stacks seismic signals.

The invention also includes a method for enhancement of one-dimensional signals such as audio signals, farther comprising transforming an input one-dimensional digital with a time-frequency decomposition into a time-frequency image, which is enhanced by the grouping bandelet enhancement of the present invention. An output enhanced one-dimensional signal is computed from this enhanced time-frequency with an inverse time-frequency transform. These time-frequency images are computed with any state of the art transform such as a window Fourier transform or a continuous wavelet transform. This enhancement preserves time-frequency geometric structures by grouping and enhancing the multiscale structures of the time-frequency signal representation.

The invention also includes a signal enhancement apparatus, comprising computer means arranged to carry out a method according to any one of the methods of the present invention.

The invention also includes a computer program product, comprising instructions to carry out a method according to any one of the methods of the present invention, when the program is run in a computer processing unit.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

Figure 1:
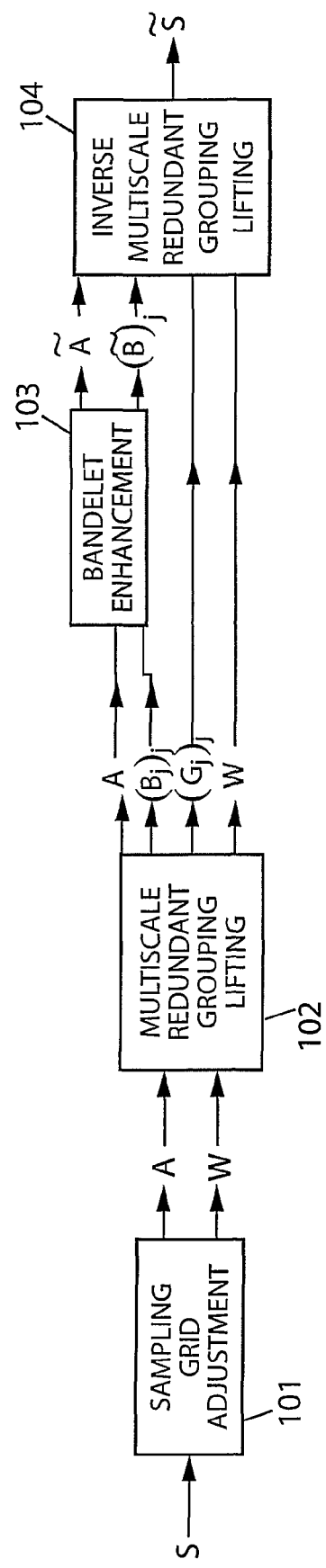
FIG. 1 shows, in block diagram form, an exemplar embodiment of the invention which takes in input a d-dimensional signal and computes an enhanced output d-dimensional signal, with a grouping bandelet enhancement.

The formalism of the mathematical expressions in the following is well known to those skilled in the art. FIG. 1 shows a system exemplifying the present invention. It takes in input a d-dimensional digitized signal S. This input signal S is specified by its values over a d-dimensional sampling grid $\mathcal{G} \subset \mathbb{N}^d$ having a total of N samples points. Each sampling point is written $m=(m_1, \ldots, m_d) \in \mathcal{G}$ where each $m_k$ is an integer, and the corresponding signal value is S[m]. Audio signals are examples of 1-dimensional signals, images are examples of 2-dimensional signals, and video image sequences are examples of 3-dimensional signals. The system of FIG. 1 outputs an enhanced signal $\tilde{S}$ that is defined on an output sampling grid $\tilde{\mathcal{G}}$ such that $\mathcal{G} \subset \tilde{\mathcal{G}}$, which has a total of $\tilde{N} \geq N$ samples. In super-resolution applications, $\tilde{\mathcal{G}}$ is strictly larger that $\mathcal{G}$. In an exemplary embodiment for video deinterlacing, $\mathcal{G}$ is an interlaced 3-dimensional grid and $\tilde{\mathcal{G}}$ is the corresponding progressive 3-dimensional grid having twice more rows than $\mathcal{G}$. In some other restoration applications $\tilde{\mathcal{G}}$ may be equal to $\mathcal{G}$.

The sampling grid adjustment (101) takes in input the digitized signal S and outputs a signal A and optimally a weight array W of positive coefficients both defined on the output sampling grid $\tilde{\mathcal{G}}$. The weight array specifies the location of missing coefficients if they exist. For all $m \in \tilde{\mathcal{G}}$, if $m \in \mathcal{G}$ then A[m]=S[m] and W[m]=1, otherwise if m is not in $\mathcal{G}$ then A[m]=NULL and W[m]=0.

An ordering is defined on the $\tilde{N}$ samples of $\tilde{\mathcal{G}}$. We write the ordering parameter $1 \leq t \leq \tilde{N}$ and $\{o(t)\}_{1 \leq t \leq \tilde{N}}$ is the ordered sequence of the $\tilde{N}$ samples of $\tilde{\mathcal{G}}$. If m=o(t) and p=o(u) with t>u then we say that p is before m and m after p. Any ordering may be chosen in the present invention. As an example, for d=2 the input sampling grid $\mathcal{G}$ may be a rectangular grid of points $(m_1, m_2)$ for which $0 \leq m_1 < M_1$ and $0 \leq m_2 < M_2$. These $N=M_1 M_2$ samples can be ordered by rows $(m_1, m_2)=o(m_2+m_1 M_2)$ or by columns $(m_1, m_2)=o(m_1+m_2 M_1)$ or any other order such as a zig-zag order along the image diagonal lines or a random ordering. As another example, for d=3, $\mathcal{G}$ may be a cube of points $(m_1, m_2, m_3)$ with $0 \leq m_1 < M_1$, $0 \leq m_2 < M_2$ and $0 \leq m_3 < M_3$. For a video, if $m_3$ is the time parameter, then for any fixed time $m_3 = t_0$ then any spatial ordering can be used for the samples $(m_1, m_2, t_0)$. For a video, in a preferred embodiment the time order has priority over the spatial order, which means that if $m_3 < m'_3$ then $(m_1, m_2, m_3)$ is before $(m'_1, m'_2, m'_3)$ with respect to this ordering. For general 3-dimensional block of data such as in seismic or medical imaging, any order may be chosen between the sampling points.

The multiscale redundant grouping lifting (102) takes in input the average signal A and the weight array W and computes a transformation over J scales where $J \geq 1$ is an integer. The processor (102) outputs multiscale grouping arrays $(G_j)_{1 \leq j \leq J}$, bandelet signals $(B_j)_{1 \leq j \leq J}$ and an updated average signal A and its weight array W, which are all arrays defined over the output sampling grid $\tilde{\mathcal{G}}$. For each $m \in \tilde{\mathcal{G}}$, $G_j[m]$ specifies a match point $q \in \tilde{\mathcal{G}}$ which is associated to m at the scale $2^j$. In an exemplary implementation $G_j[m]=q-m$. The coefficient $B_j[m]$ in an inner product between the original signal S[p] and a bandelet $b_{j,m}[p]$ defined over the grid $\mathcal{G}$: $B_j[m]=\langle S, b_{j,m} \rangle$. The enhancement (103) takes in input multiscale bandelet signals $(B_j)_{1 \leq j \leq J}$ and the average signal A and outputs enhanced bandelet signals $(\tilde{B}_j)_{1 \leq j \leq J}$ and an enhanced average signal $\tilde{A}$. The enhancement calculation is performed according to a particular application such as noise removal. The inverse multiscale redundant grouping lifting processor (104) takes in input enhanced bandelet signals $(\tilde{B}_j)_{1 \leq j \leq J}$, the enhanced average signal $\tilde{A}$ with its weight array $\tilde{W}$, the multiscale grouping arrays $(G_j)_{1 \leq j \leq J}$ and it outputs the enhanced signal $\tilde{S}$.

Figure 2:
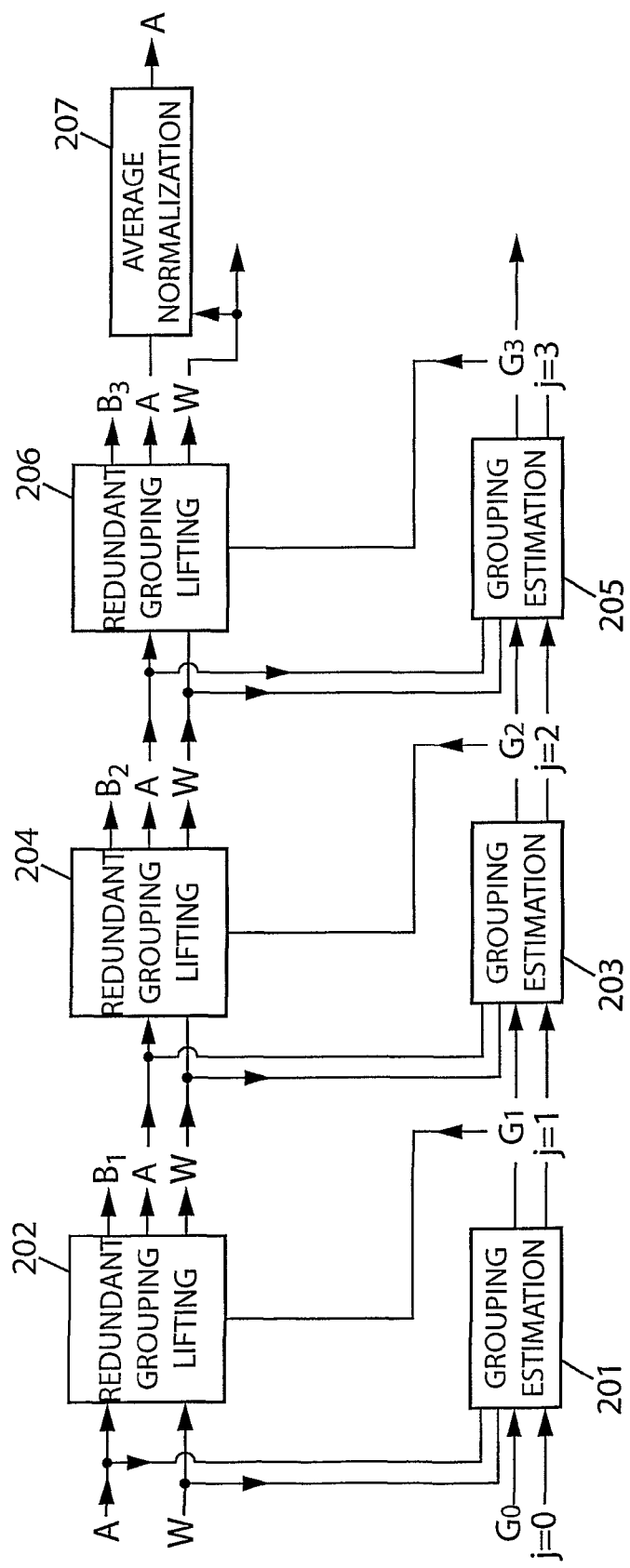
FIG. 2 shows, in block diagram form, an exemplary configuration of a multiscale redundant grouping lifting on J=3 scales.

FIG. 2 shows, in block diagram form, an exemplary configuration of the multiscale redundant grouping lifting (102) over J=3 scales. It takes in input the average signal A and optionally its weight array W and it outputs bandelet signals $(B_j)_{1 \leq j \leq J}$, an updated average signal A with its optional weight array W and multiscale grouping arrays $(G_j)_{1 \leq j \leq J}$ for J=3. The grouping array $G_0$ in input of the grouping estimation (201) can be initialized to 0: for all $m \in \tilde{\mathcal{G}}$ $G_0[m]=0$, or it can be initialized to any other value and j=0. This processor is implemented with a cascade of J=3 pairs of grouping estimation modules and redundant grouping lifting processors, (201)-(202), (203)-(204), (205)-(206) at scales $2^j=2^1, 2^2, 2^3$. These modules are particular instances of the grouping estimation (301) and redundant grouping lifting (302) given in FIG. 3 at a generic scale $2^j$. The grouping estimation processors (201), (203) and (205) output respectively the multiscale grouping arrays $G_1$, $G_2$ and $G_3$. The redundant grouping lifting processors (202), (204) and (206) take input respectively $G_1$, $G_2$ and $G_3$, and output respectively the bandelet signals $B_1$, $B_2$ and $B_3$. The input average and weight arrays A and W are input in (202) which outputs new values for A and W which go in input of (204) which outputs new values for A and W which go in input of (206), which outputs new values for A and W, which optionally go in input of (207). The optional average normalization (207) outputs new values for A.

Figure 3:
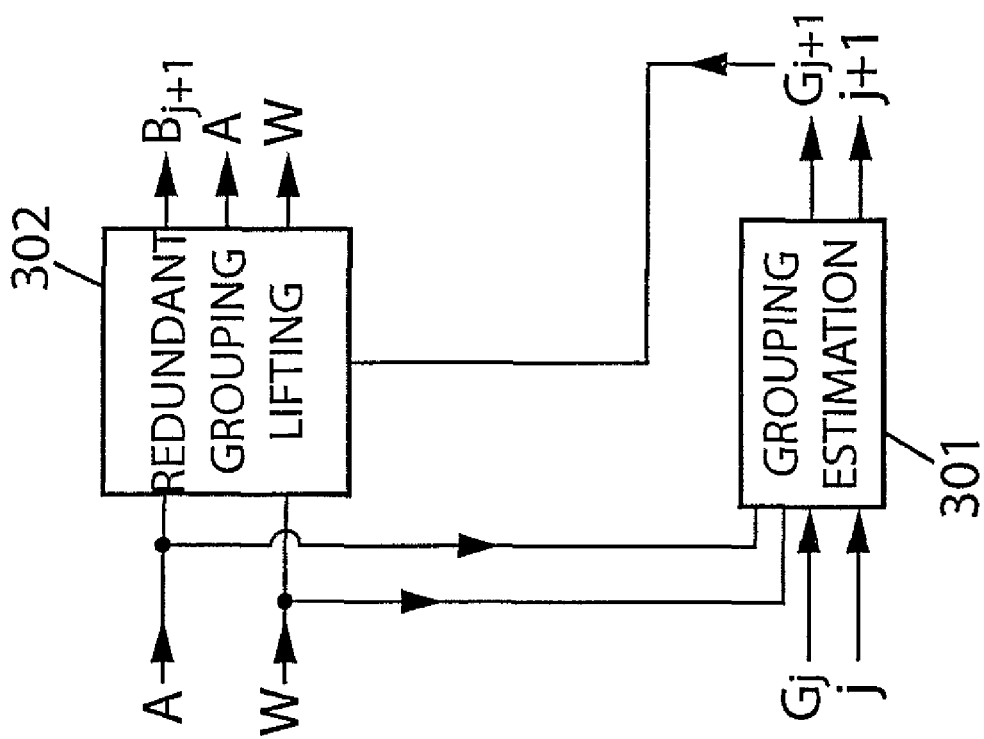
FIG. 3 shows, in block diagram form, an exemplary configuration of an elementary processing unit at a scale $2^j$ of a multiscale redundant grouping lifting.

FIG. 3 shows, in block diagram form, an exemplary configuration of a pair of grouping estimation module (301) and redundant grouping lifting module (302) at a generic scale $2^j$. The grouping estimation (301) takes in input a signal A a weight array W and a grouping array $G_j$ at the scale $2^j$ and it outputs a new grouping array $G_{j+1}$ at the next scale $2^{j+1}$. The redundant grouping lifting processor (302) takes in input the signal A and the weight array W together with $G_{j+1}$ calculated by (301) and it outputs $B_{j+1}$ and new values for A and W, at the scale $2^{j+1}$.

Figure 4:
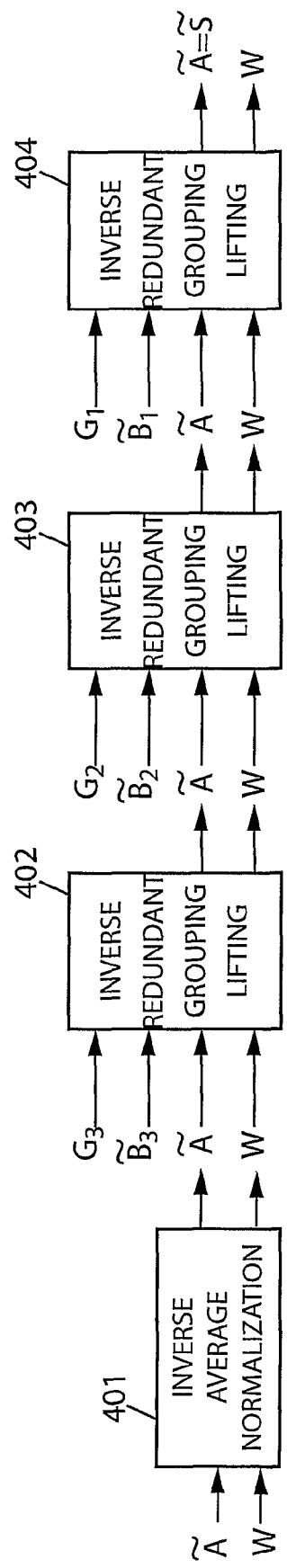
FIG. 4 shows, in block diagram form, an exemplary configuration of an inverse multiscale redundant grouping lifting on J=3 scales.

FIG. 4 shows, in block diagram form, an exemplary configuration of the inverse multiscale redundant grouping lifting (104) over J=3 scales levels. It takes in input enhanced bandelet signals $(\tilde{B}_j)_{1 \le j \le J}$, multiscale grouping arrays $(G_j)_{1 \le j \le J}$, and an enhanced average signal $\tilde{A}$ with optionally a weight array W, and it outputs a reconstructed signal $\tilde{S}$. The optional inverse normalization (401) takes in input $\tilde{A}$ and W and updates the values of $\tilde{A}$. The inverse redundant grouping lifting processor (402) takes in input $G_3$, $\tilde{B}_3$, $\tilde{A}$ and W and output new values for $\tilde{A}$ and W which are in input of (403) together with $G_2$ and $\tilde{B}_2$. The inverse redundant grouping lifting processor (403) outputs new values for $\tilde{A}$ and W which are in input of (404) together with $G_1$ and $\tilde{B}_1$, and (404) outputs new values for $\tilde{A}$ and W, and the overall output is $\tilde{S}=\tilde{A}$. The modules (402), (403), (404) are particular instances at scales $2^j=2^1, 2^2, 2^3$, of the inverse redundant grouping lifting processor (501).

Figure 5:
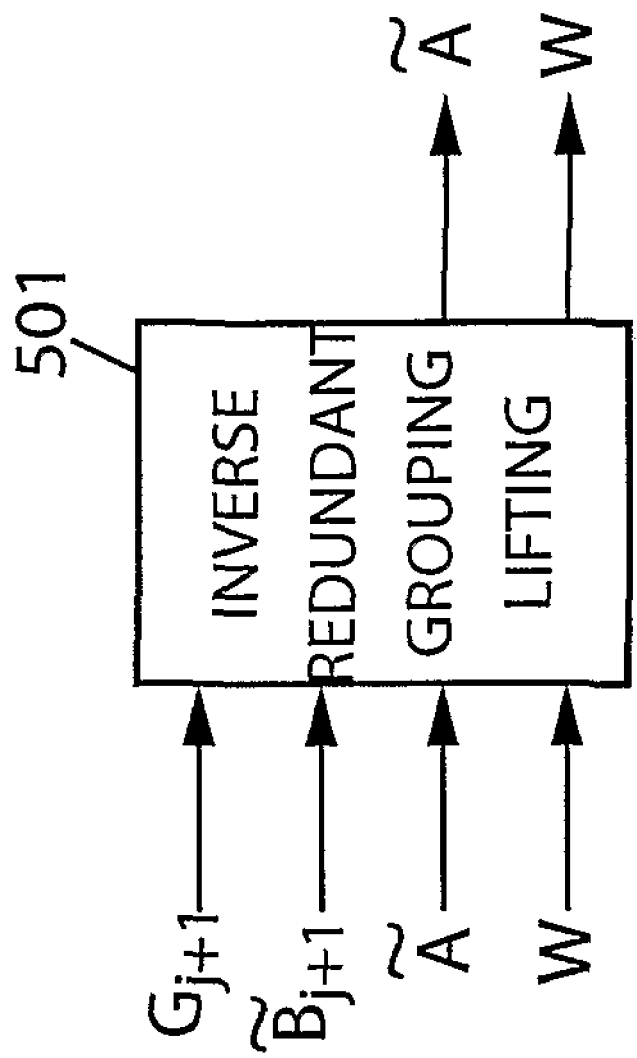
FIG. 5 shows, in block diagram form, an exemplary configuration of an elementary processing unit at a scale $2^j$ an inverse multiscale redundant grouping lifting.

FIG. 5 shows, in block diagram form, an exemplary configuration of an inverse redundant grouping lifting processor (501) at a generic scale $2^j$. It takes in input a grouping array $G_{j+1}$, bandelet signals $B_{j+1}$, an average signal $\tilde{A}$ and its weight $\tilde{W}$ at a scale $2^{j+1}$, and (501) outputs new values for $\tilde{A}$ and W at the finer scale $2^j$.

Figure 6:
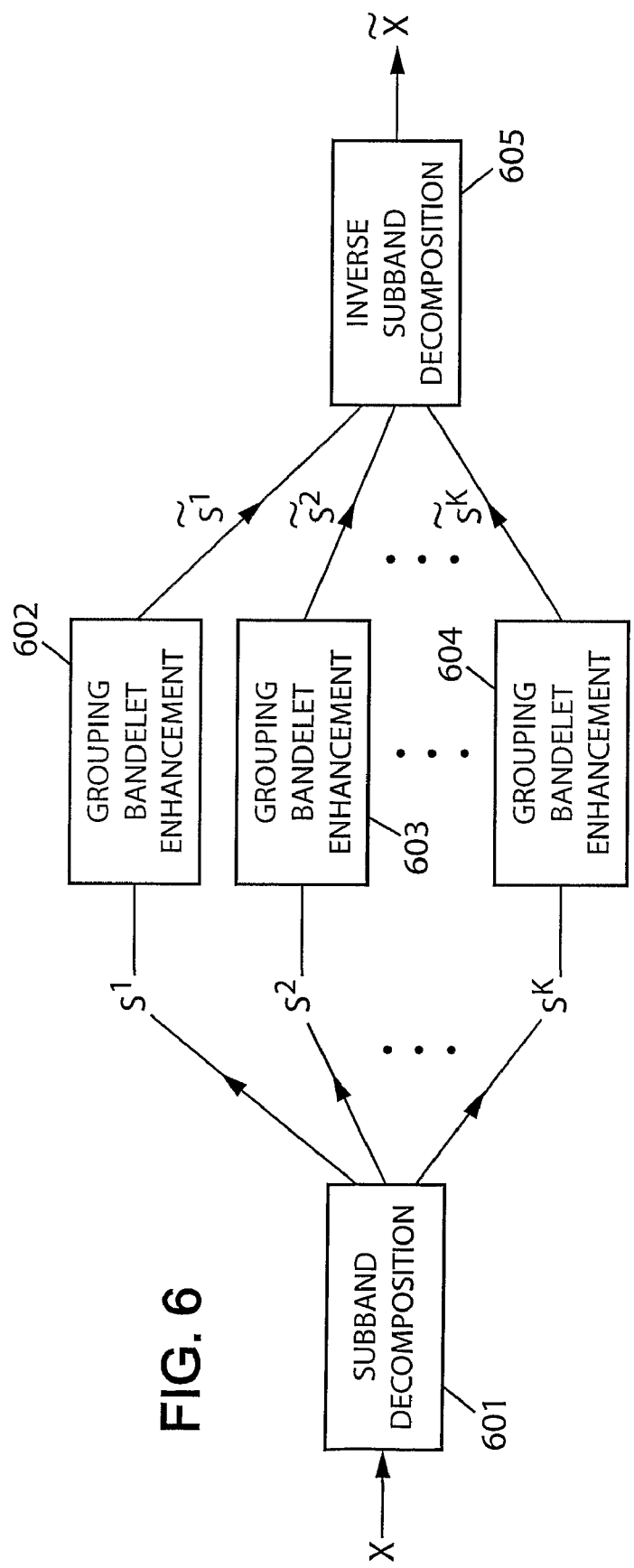
FIG. 6 shows, in block diagram form, an exemplary embodiment of the invention with a subband grouping bandelet enhancement.

FIG. 6 shows another system exemplifying the present invention. It takes in input a digitized signal X defined over d-dimensional sampling grid $\mathcal{G}$ having a total of N samples points. The system of FIG. 6 outputs an enhanced signal $\tilde{X}$ that is defined on an output sampling grid $\tilde{\mathcal{G}}$ such that $\mathcal{G} \subset \tilde{\mathcal{G}}$, which has a total of $\tilde{N} \ge N$ samples. The subband decomposition (601) decomposes the input signal X into K subband signals $(S^k)_{1 \le k \le K}$ which are equal to a filtering of X with bandpass filters $(h^k)_{1 \le k \le K}$. Each $S^k$ is defined on the sampling grid $\mathcal{G}$ and has N samples. The subband signals $(S^k)_{1 \le k \le K}$ are transformed by grouping bandelet enhancement modules illustrated in (602), (603) and (604), which output enhanced subband signals $(\tilde{S}^k)_{1 \le k \le K}$. Each $\tilde{S}^k$ is defined on the output sampling grid $\tilde{\mathcal{G}}$. The inverse subband decomposition (605) reconstructs a signal $\tilde{X}$ defined on the sampling grid $\tilde{\mathcal{G}}$ from the subband signals $(\tilde{S}^k)_{1 \le k \le K}$, by filtering them with reconstruction filters $(\tilde{h}^k)_{1 \le k \le K}$.

Grouping Estimation

The grouping estimation module (301) takes a scale parameter j, a grouping array $G_j$, an input signal A and its weight array W, all of them defined on the sampling grid $\tilde{\mathcal{G}}$ and it outputs a grouping array $G_{j+1}$ at the next scale $2^{j+1}$. For each $m \in \mathcal{G}$, $G_{j+1}[m]$ specifies the coordinates of a point p which is a best match for m located before $m \in \tilde{\mathcal{G}}$ in the sense of the order o(t). In an exemplary embodiment $G_{j+1}[m]=p-m$.

Any state of the art grouping estimation process may be used. In an exemplary embodiment, $G_{j+1}$ is calculated from $G_j$ with an optional block matching procedure. For each $m \in \tilde{\mathcal{G}}$, in an exemplary embodiment (301) computes $q=m+G_j[m]$ and $p=q+G_j[q]$. In yet another embodiment $p=m+2G_j[m]$. The best match for m is selected among a set of candidates in a neighborhood $\mathcal{N}_j(p)$ of p, which depends upon the scale $2^j$. The best match for m is defined as a point $p' \in \mathcal{N}_j(p)$ such that the values of A in the neighborhood of p' are the most similar to the values of A in the neighborhood of m, for a given distance.

If $\tilde{\mathcal{G}}$ is strictly larger than $\mathcal{G}$, in an exemplary embodiment non existing signal sample points are computed with an interpolation from neighbors and stored in $\tilde{A}$. For all $m \in \tilde{\mathcal{G}}$ if $W[m]>0$ then $\tilde{A}[m]=A[m]$. Otherwise if $W[m]=0$ then $\tilde{A}[m]$ is calculated with any state of the art interpolation from neighborhood samples $\tilde{A}[l]$ for which $W[l]>0$.

A block matching isolates a block of signal values around m, defined by a set of displacements $\tau \in \beta$ relatively to m, where $\beta$ is a data block. In an exemplary embodiment, the block matching is performed with an $l^r$ distance. A best match is obtained by minimizing $$\sum_{\tau \in \beta} |\tilde{A}[m-\tau] - \tilde{A}[k-\tau]|^r \quad (1)$$

among all $k \in \mathcal{N}_j(p)$. We find $p' \in \mathcal{N}_j(p)$ where the minimum is reached and set $G_{j+1}[m]=p'-m$. In exemplary embodiments, r=1 or r=2. The distance (1) may be replaced by any distance over blocks of data.

In an exemplary embodiment the data block B is chosen to be a hyper-rectangle of width $w=(w_1, \ldots, w_d)$, which includes all $\tau=(\tau_1, \ldots, \tau_d)$ with $|\tau_i| \le w_i$. For block matching over videos, in an exemplary embodiment the data block is a 2-dimensional rectangle that remains in the same spatial image, which corresponds to a hyper-rectangle with $w_3=0$ in time.

In an exemplary embodiment the neighborhood $\mathcal{N}_j(p)$ is a "past hyper-rectangle" of p of width $w'=(w'_1, \ldots, w'_d)$. Such a "past hyper-rectangle" is defined as a set of all k that are located before p in the sense of the order o(t), and such that $|p_i-k_i|<w'_i$ for $1 \le i \le d$. This may be half of the hyper-rectangle. For example, in an image (d=2) which is ordered row by row, a "past hyper-rectangle" of p is the rectangle $k=(k_1, k_2)$ with $-w'_1 \le k_1 < p_1$ and $|k_2-p_2|<w'_2$ or $k_1=p_1$ and $-w'_2 \le k_2 < p_2$. In a video sequence where the spatial image are ordered by rows and the time order has priority, a "past hyper-rectangle" is the rectangle with either $k_3<p_3$ and $|k_1-p_1|<w'_1$ and $|k_2-p_2|<w'_2$ or $k_3=p_3$ and $-w'_1 \le k_1 < p_1$ and $|k_2-p_2|<w'_2$ or $k_3=p_3$ and $k_1=p_1$ and $-w'_2 \le k_2 < p_2$. In this case the grouping array may associate points of the same image, which corresponds to a spatial geometry, or it may group points in images at different times which corresponds to a time movement. To impose a grouping array that gives a time movement, one can restrict $\mathcal{N}_j(p)$ to the set k with $k_3<p_3$ and $|k_1-p_1|<w'_1$ and $|k_2-p_2|<w'_2$.

In an exemplary embodiment of super-resolution applications, a neighborhood $\mathcal{N}_j(p)$ may include only points k such that $W[k]\neq 0$. This guaranties that the matching point has a data value. An exemplary embodiment is $\mathcal{N}_j(p)$ equal to the restriction of a "past hyper-rectangle" for which W is non-zero.

The neighborhood $\mathcal{N}_j(p)$ may depend upon the scale $2^j$. In yet another exemplary embodiment for $j>0$ the neighborhood $\mathcal{N}_j(p)$ is reduced to $\{p\}$ in which case for $j>0$ no block matching needs to be computed since there is a single possible match. In this case $G_{j+1}[m]=G_j[m]+G_j[q]$ with $q=m+G_j[m]$. This reduces the overall complexity but the resulting multi-scale grouping array is less precise.

Redundant Grouping Lifting

The redundant grouping lifting (302) takes in input a signal A at the scale $2^j$ together with its weight array W and the grouping array $G_{j+1}$, and outputs at the next scale $2^{j+1}$ the bandelet signals $B_{j+1}$ and new values for A and W at the scale $2^{j+1}$.

The module (302) scans all sample points of the sampling grid $\tilde{\mathcal{G}}$ in the order specified by o(t). For all integer t from 1 to $\tilde{N}$, let $p=o(t)$ and $q=p+G_{j+1}[p]$, this module computes $$V = W[p]+W[q].$$

In an exemplary embodiment, a non-normalized redundant grouping lifting is calculated with averages and differences as follow, which require few operations. If V>0 then $$B_{j+1}[p] = A[q] - A[p]$$
$$A[q] = \frac{A[p]+A[q]}{2}$$
$$W[q] = V.$$

Otherwise if V=0 then $B_{j+1}[p]=0$ and A[q]=NULL. In this case, the average normalization module (207) is omitted. If $\mathcal{G}=\tilde{\mathcal{G}}$, this redundant grouping lifting does not require to use a weight array and compute W[q] since we always have V>0.

In yet another exemplary embodiment of this module, a normalized redundant grouping lifting is calculated with weighted averages and normalized differences. If V>0 then $$B_{j+1}[p] = (A[q] - A[p])\frac{\sqrt{W[p]W[q]}}{\sqrt{V}}$$
$$A[q] = \frac{W[p]A[p]+W[q]A[q]}{V}$$
$$W[q] = V.$$

Otherwise if V=0 then $B_{j+1}=[p]=0$ and A[q]=NULL. Each bandelet coefficient $B_{j+1}[p]$ obtained with a normalized redundant grouping lifting is an inner product of the incoming signal S with bandelets of norm 1. This normalization stabilizes the multiscale redundant grouping lifting, which is important for noise removal. If the redundant grouping lifting is normalized then the optional average normalization module (207) updates for all $m \in \tilde{\mathcal{G}}$ $A[m]=A[m]\sqrt{W[m]}$ Inverse Redundant Grouping Lifting The inverse redundant grouping lifting processor (501) takes in input at the scale $2^{j+1}$ the grouping array $G_{j+1}$, the bandelet signals $B_{j+1}$, the signal A and the corresponding weights W and computes at the scale $2^j$ the signal A and its corresponding weights W.

If the redundant grouping lifting is normalized then the optional inverse average normalization module (401) sets for all $m \in \tilde{\mathcal{G}}$ $\tilde{A}[m]=\tilde{A}[m]/\sqrt{W[m]}$. For a non-normalized redundant grouping lifting the optional inverse average normalization module (401) is not used.

The processor (501) scans all points of $\tilde{\mathcal{G}}$ in the reverse order specified by o(t). For all t decreasing from $\tilde{N}$ to 1, let $p=o(t)$ and $q=p+G_{j+1}[p]$. It computes $$V = W[q] - W[p]$$

If (W[p]=0 and A[p]=NULL) then A[p]=A[q].
If (W[p]=0 and V≠0 and A[p]≠NULL) then A[p]=(A[q]+A[p])/2.
If (W)≠0 and V=0) then W[q]=V.
If (W[p]≠0 and V≠0) the inversion depends if the multiscale redundant grouping lifting was normalized or not. For a non-normalized redundant grouping lifting, module (501) computes $$C = A[q] - \frac{B_j[p]}{2}$$
$$A[p] = \frac{A[p]+C}{2}$$
$$A[q] = A[q] + \frac{B_j[p]}{2}$$
$$W[q] = V.$$

If $\mathcal{G}=\tilde{\mathcal{G}}$ then this inverse redundant grouping lifting does not require to use a weight array, because we always have V>0.

For a normalized redundant grouping lifting, module (501) computes $$C = A[q] - B_j[p]\frac{\sqrt{V}}{\sqrt{W[q]W[p]}}$$
$$A[p] = \frac{A[p]+C}{2}$$
$$A[q] = A[q] + B_j[p]\frac{\sqrt{W[p]}}{\sqrt{VW[q]}}$$
$$W[q] = V.$$

Enhancement

The enhancement (103) takes in input the bandelet signals $(B_j)_{1\leq j\leq J}$ and A computes enhanced bandelet signals $(\tilde{B}_j)_{1\leq j\leq J}$ and an enhanced average signal Ã. The enhancement can be implemented with any state of the art linear or non-linear operator.

In an exemplary embodiment, a enhancement is computed by applying diagonal operators to bandelet signals $B_j[m]$. A diagonal operator applied to a bandelet coefficient $B_j[m]$ computes $\theta_j(B_j[m])$ where $\theta_j(\chi)$ is a linear or non-linear function. Thresholding functions have been shown to be particularly effective to remove noise. A hard thresholding function is defined by $\rho_T(\chi)=\chi$ if $|\chi|>T$ and $\rho_T(\chi)=0$ otherwise and a soft thresholding function is defined by $\rho_T(\chi)=\chi-\text{sign}(\chi)T$ if $|\chi|>T$ and $\rho_T(\chi)=0$ otherwise. Other thresholding functions that attenuate coefficients depending upon their amplitude may be used as well. The function $\theta_j$ can be chosen to be a $\theta_j(\chi)=\alpha_j \rho_T(\chi)$ where $\alpha_j$ is an amplification factor that can depend on the noise level. Any other state of the art non-linear attenuation or amplification functions may be used.

In another exemplary embodiment of the enhancement module (103), non-diagonal enhancement operators are used. The amplification factor may depend upon m: $\alpha_j[m]$ is calculated depending upon the relative amplitude of the bandelet coefficient $B_j[m]$ and other "neighborhood" bandelet coefficients $B_{j'}[m']$ for m' close to m and j' close to j. Such enhancement operators are used to enhance the wavelet coefficients of medical images.

Subband Decomposition and Inverse

The subband decomposition processor (601) takes in input a signal X and computes subband signals by convolutions with band-pass filters $h_k$:

$$\forall m \in \mathcal{G}, S^k[m] = X * h_k[m] = \sum_{p \in \mathcal{G}} X[p] h_k[m-p].$$

This convolution may be calculated with any state of the art fast algorithm.

The subband signals $(S^k)_{1 \leq k \leq K}$ are transformed by grouping bandelet enhancement modules illustrated in (602), (603) and (604), which output enhanced subband signals $(\tilde{S}^k)_{1 \leq k \leq K}$. Each $\tilde{S}^k$ is defined on the output sampling grid $\tilde{\mathcal{G}}$. If the output grid $\tilde{\mathcal{G}}$ is equal to the input sampling grid $\mathcal{G}$ then the inverse subband decomposition (605) computes $$\forall m \in \tilde{\mathcal{G}} \tilde{X}[m] = \sum_{k=1}^{K} \tilde{S}^k * \tilde{h}^k[m] = \sum_{k=1}^{K} \sum_{p \in \mathcal{G}} \tilde{S}^k[p] \tilde{h}_k[m-p], \quad (2)$$

where $(\tilde{h}^k)_{1 \leq k \leq K}$ is a family of perfect reconstruction filters associated to the decomposition filters $(h^k)_{1 \leq k \leq K}$ defined on $\mathcal{G}$. The convolutions (2) may be calculated with any state of the art fast algorithm. In an exemplary embodiment, the transfer function of these filters $\{\widehat{\tilde{h}^k[\omega]}\}_{1 \leq k \leq K}$ and $\{\widehat{h^k[\omega]}\}_{1 \leq k \leq K}$ satisfy:

$$\forall \omega, \sum_{k=1}^{K} \hat{\tilde{h}}^k[\omega] \hat{h}^k[\omega] = 1.$$

Any state of the art subband filtering procedure may be used to implement the subband decomposition processor (601) and its inverse in (605). The subband decomposition may correspond to a non-sampled wavelet dyadic transform or wavelet packet transform or any state of the art subband filtering. An exemplary embodiment of (601) and (605) is obtained with a separable translation invariant oversampled wavelet transform. In d=2 dimensions, a separable wavelet transform may have 3 orientations at each scales so it outputs K=3 L subbands over L scales. A fast "algorithme à trous" computes these subband signals with a cascade of separable filtering with conjugate mirror filters. Haar and Daubechies perfect reconstruction filters are examples of such filters. In d=3 dimensions, for videos, one may use a 3 dimensional wavelet transform with 7 "orientations" at each scale. For video sequences, in another exemplary embodiment, one can use a two-dimensional subband filtering for each spatial image, such as a wavelet subband decomposition, and no subband decomposition in time.

If $\tilde{\mathcal{G}}$ is different than $\mathcal{G}$ and if there is more than one subband, then the present invention imposes that $\tilde{\mathcal{G}} = \cup_{l=1}^{L} \mathcal{G}_l$ where each grid $\mathcal{G}_l$ is obtained with a translation of the sampling grid $\mathcal{G}$ by an integer vector $\tau_l$, with $\tau_1=0$. We denote by $\mathcal{G}_l=\mathcal{G}+\tau_l$ the grid of points $m+\tau_l$ for all $m \in \mathcal{G}$.

In an exemplary embodiment in dimension d, for a rectangular image grid $\mathcal{G}$, if $\tilde{\mathcal{G}}$ is a sampling grid with $\{\alpha_i\}_{1 \leq i \leq d}$ more rows in each direction, then there are $L=\alpha_1 \alpha_2 \ldots \alpha_d$ vectors $\tau_l$ and subgrids $\tilde{\mathcal{G}}$. In yet another exemplary embodiment for a quincunx oversampling, $\tilde{\mathcal{G}}$ has twice more samples than $\mathcal{G}$ and there are only L=2 two vectors $\tau_1=0$ and $\tau_2=(1, 1, \ldots, 1)$.

A subband signal $\tilde{S}^k$ is decomposed as a union of signals $\tilde{S}_l^k$ equal to the restriction of $\tilde{S}^k$ on the sub-grid $\mathcal{G}_l$ of $\tilde{\mathcal{G}}$. The inverse subband decomposition (605) computes for each $1 \leq l \leq L$ $$\forall m \in \tilde{\mathcal{G}}, \tilde{X}[m+\tau_l] = \sum_{k=1}^{K} \sum_{p \in \mathcal{G}} \tilde{S}_l^k[p+\tau_l] \tilde{h}_k[m-p]. \quad (3)$$

This sum of convolutions is performed with any state of the art fast algorithm.

With a minor modification of the subband grouping bandelet enhancement illustrated in FIG. 6, the multiscale grouping estimation is only performed once on the input image X, which reduces the computational complexity. In an exemplary embodiment, the first subband signal $S^1$ is equal to X. The multiscale grouping array $(G_j)_{1 \leq j \leq J}$ computed by the grouping bandelet enhancement module (602) is then used by the grouping bandelet enhancement modules of all other subband images $S^k$, illustrated in (603) and (604). The multiscale redundant grouping lifting modules (102) incorporated in these bandelet enhancement modules use the multiscale grouping array $(G_j)_{1 \leq j \leq J}$ calculated from X and thus does not need to compute again the grouping estimation modules (201), (203) and (205).

Grouping Bandelet Inverse Degradation

Figure 7:
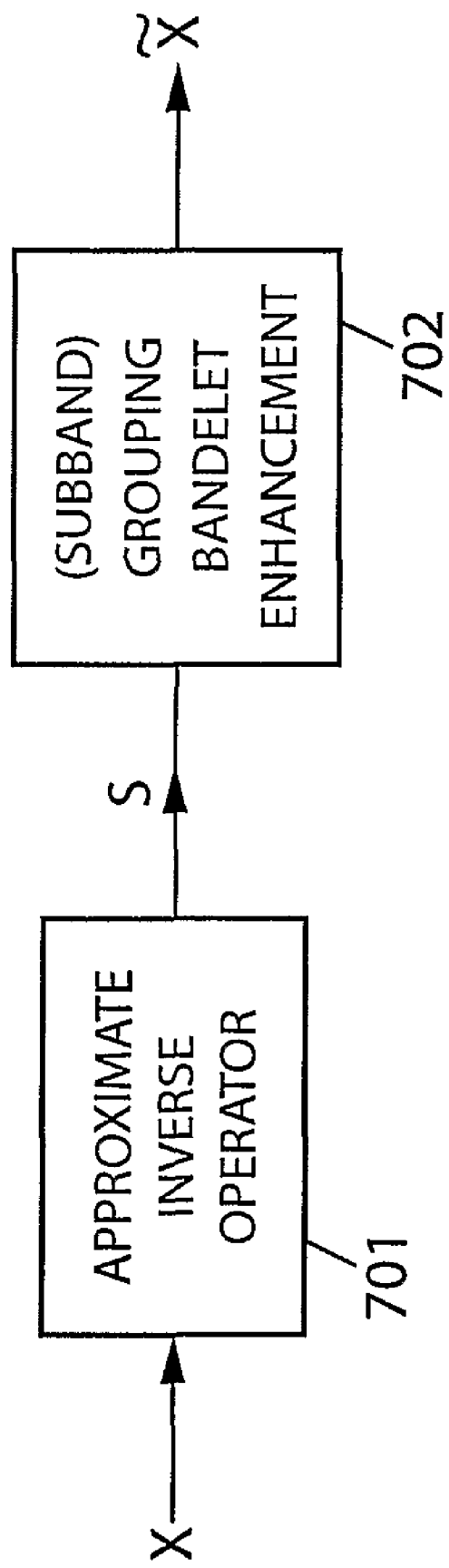
FIG. 7 shows, in block diagram form, an exemplary configuration of an inverse degradation process including a grouping bandelet enhancement or a subband grouping bandelet enhancement.

FIG. 7 illustrates an exemplary embodiment of the present invention to restore signals degraded by an operator O to which is added noise. The approximate inverse degradation module (701) computes a signal $S=\tilde{O}^{-1}X$ where $\tilde{O}^{-1}$ is an approximate inverse of O. In an exemplary embodiment, the operator O is a convolution operator Of=f*h and $\tilde{O}^-=f*h^{-1}$ is an approximate inverse convolution. Let $\hat{h}$ and $\hat{h}^{-1}$ be the Fourier transform of h and $h^{-1}$. The transfer function $\hat{h}^{-1}(\omega)$ is typically close to $1/\hat{h}(\omega)$ when this value is not too large. The value of $\hat{h}^{-1}(\omega)$ is adjusted according to any state of the art formula such as a Wiener filtering formula. Such a deconvolution can amplify the noise which is then partly removed by module (702). This module may either be a subband grouping bandelet enhancement or a grouping bandelet enhancement.

Sparse Bandelet Restoration

The present invention includes a signal enhancement procedure which takes in input a plurality of related signals $(X^i)_{1 \leq i \leq I}$ where I is an integer larger or equal to 1. Examples of such signals are different color frequency bands of an image or multiple stacks of seismic data. Let $O^i$ be the degradation operator for each $X^i$. For a seismic inversion $O^i$ is a convolution with a particular seismic wavelet $h^i$.

Figure 8:
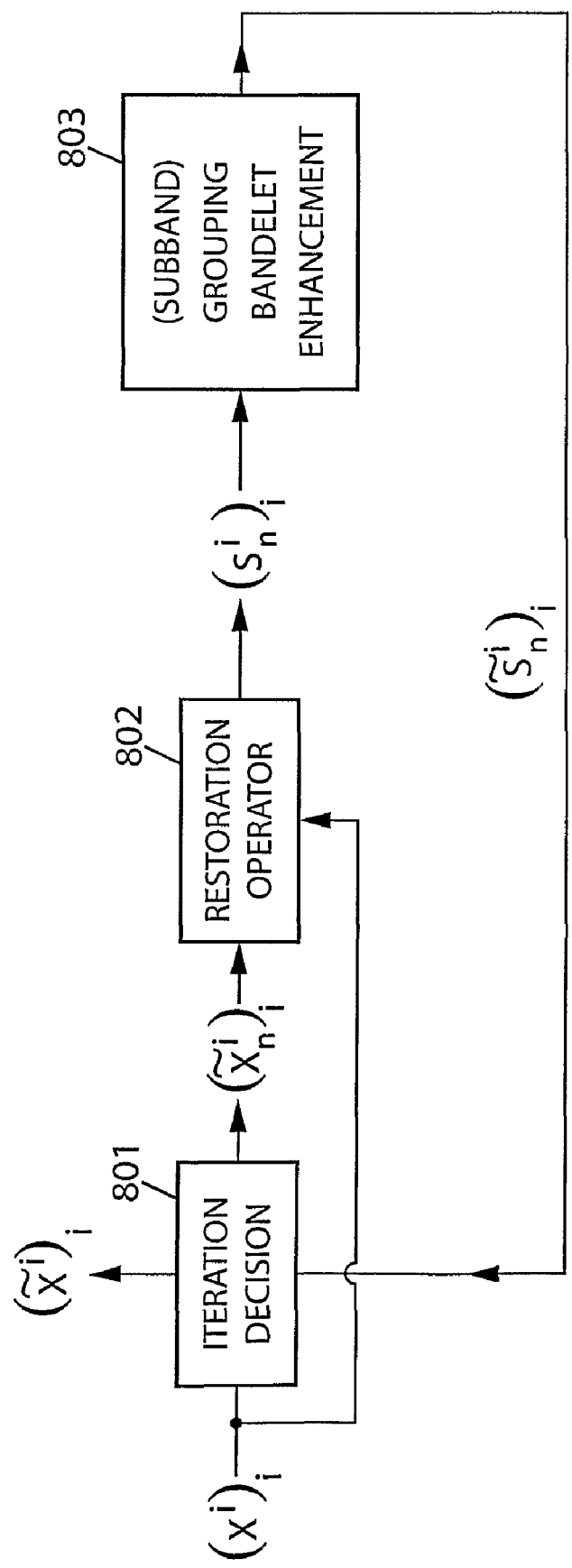
FIG. 8 shows, in block diagram form, an exemplary configuration of an enhancement of a plurality of input signals by iterating on grouping bandelet enhancement or a subband grouping bandelet enhancement.

FIG. 8 gives an exemplary embodiment of a system that performs such a signal enhancement. The iteration decision module (801) takes in input the signals $(X^i)_{1 \leq i \leq I}$ and first initializes the iteration by setting a counter n=1 and the output signals $S_n^i = X^i$.

The restoration operator module (802) takes in input the signals $(\tilde{X}_n^i)_{1 \leq i \leq I}$ and applies to each $\tilde{X}_n^i$ an operator that depends upon $O^i$ and on the input data $X^i$. It outputs the signal $S_n^i$. In an exemplary embodiment, one can set $S_n^i = \tilde{X}_n^i + \mu_i O^{i*}(X^i - O^i \tilde{X}_n^i)$ where $\mu_i$ is a constant and $O^{i*}$ is the adjoint of the operator $O^i$. The module (803) is either a grouping bandelet enhancement or a subband grouping bandelet enhancement. It computes the bandelet signals $B_j^i$ of each $S_n^i$. When I=1, in an exemplary embodiment the enhancement of these bandelet signals is performed with a thresholding operator that may be a hard or any soft thresholding procedure. When I>1 the thresholding may depend upon the values of $B_j^{i'}[m]$ for different $1 \leq i' \leq I$.

The module (803) outputs enhanced signals $(\tilde{S}_n^i)_{1 \leq i \leq I}$ which are inputs in the decision module (801). In an exemplary embodiment, the multiscale grouping arrays computed in the multiscale redundant grouping lifting processor (102) of the module (803) are only computed during the first iteration n=1. The resulting multiscale grouping arrays are used in the multiscale redundant grouping lifting processor (102) for all other iterations, which reduces computations since the grouping estimation modules (201), (203) and (205) are not used in these other iterations.

Any stopping iteration criteria may be used to stop the iterations in the iteration decision module (801). In an exemplary embodiment of (801) the number of iterations n is limited to a prescribed value P, in yet another embodiment the iterations continue as long as the error $\sum_{i=1}^{I} \alpha_i \|O^{i\tilde{S}}{}_n^i - X^i\|^2 > \epsilon$ where $\epsilon$ is a predefined threshold. If the stopping iteration criteria is not met and if $n \neq 1$ then $\tilde{X}_n^i = \tilde{S}_n^i$ where $(\tilde{S}_n^i)_{1 \leq i \leq I}$ is the second input of the iteration to decision module (801). If the stopping iteration criteria is met then $\hat{X}^i = \tilde{S}_n^i$ and the process is stopped.

The restoration process of FIG. 8 can be used to compute a reflectivity signal from single stacks or multiple stacks seismic images or 3-dimensional seismic blocks of data.

Time-Frequency Multiscale Grouping Enhancement

Figure 9:
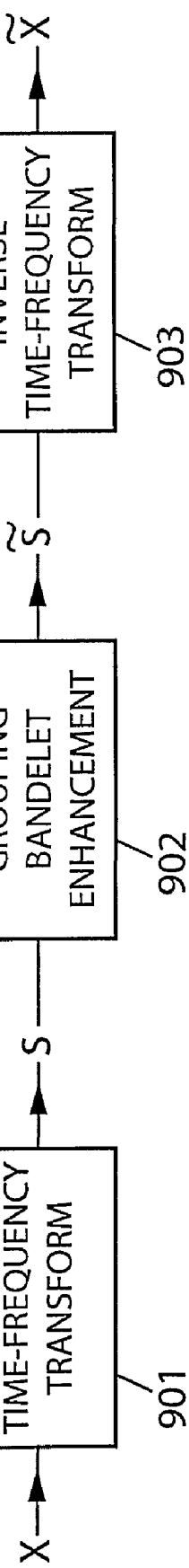
FIG. 9 shows, in block diagram form, an exemplary configuration of an enhancement of an input one-dimensional signal with a grouping bandelet enhancement of the signal time-frequency transform.

FIG. 9 illustrates an exemplary embodiment of the present invention for one-dimensional signals X[m]. The time-frequency transform (901) takes in input X and outputs a time-frequency image $S[m_1, m_2]$ sampled on a grid $\mathcal{G}$. Any state of the art time-frequency transform may be used. Window Fourier transforms or continuous wavelet transforms are examples of such time-frequency transforms. For a window Fourier transform $m_1$ is a time index and $m_2$ is a frequency index. For a wavelet transform $m_1$ is a time index and $m_2$ is a scale index. In an exemplary embodiment the scale index $m_2$ corresponds to a scale parameter $s = a^{m_2}$ where a is a chosen parameter, and $m_1$ corresponds to a time location $t = b m_1 a^{m_2}$ where b is a chosen parameter.

The grouping bandelet enhancement module (902) suppresses noise and can compute a super-resolution image $\tilde{S}$ by taking advantage of the multiscale geometric regularity of the input time-frequency image. An inverse time-frequency transform (903) applied to $\tilde{S}$ computes an output signal $\tilde{X}$. If the module (901) is a continuous wavelet transform then (903) implements an inverse continuous wavelet transform. If (901) is a window Fourier transform then (903) is an inverse window Fourier transform. This grouping bandelet enhancement over a time-frequency transform is particularly efficient for removing noises from audio signals.

While a detailed description of presently exemplary embodiments of the invention has been given above, various alternatives, modifications, and equivalents will be apparent to those skilled in the art. For example, while different components of the grouping estimation module of the present invention are described herein as performing certain specific functions, one skilled in the art will appreciate that other components or circuits in the service module may perform some or all of such functions without varying from the spirit of the invention. Therefore, the above description should not be taken as limiting the scope of the invention which is defined by the appended claims.

The invention claimed is:

1. A method of enhancing a digital signal, comprising:
   (a) providing an incoming signal having sample values associated to points of a d-dimensional input sampling grid, d being an integer at least equal to 1, and providing a d-dimensional output sampling grid with an ordering of points of said output sampling grid;
   (b) deriving an average signal defined on said output sampling grid with a sampling grid adjustment applied to said incoming signal;
   (c) iteratively increasing a scale parameter, and for each scale deriving a grouping array, wherein said grouping array associates to each sample of said average signal a match sample located before with respect to said ordering of points of said output sampling grid; and for each scale updating said average signal and deriving a bandelet signal with a redundant grouping lifting;
   (d) computing an enhanced bandelet signal at each scale and an enhanced average signal with an enhancement process applied to said bandelet signal at each scale and to said average signal obtained after the last iteration of step c; and
   (e) iteratively decreasing a scale parameter, and for each scale updating the enhanced average signal with an inverse redundant grouping lifting depending on said enhanced bandelet signal at said scale, and outputting the enhanced average signal derived at the end of said iteration as an enhanced digital signal.

2. A signal enhancement method according to claim 1, wherein said redundant grouping lifting in step c comprises updating said average signal and deriving a bandelet signal with averages and differences of pairs of average signal samples associated by said grouping array.

3. A signal enhancement method according to claim 1, wherein said sampling grid adjustment in step b comprises outputting a weight array defined on the output sampling grid, the weight array having values indicating points of the output sampling grid that are not in the input sampling grid; and wherein said redundant grouping lifting in step c comprises updating said average signal and deriving a bandelet signal with averages and differences computed according to said weight array values, and wherein said redundant grouping lifting further comprises updating said weight array.

4. A signal enhancement method according to claim 3, wherein said redundant grouping lifting in step c further comprises updating said average signal and deriving a bandelet signal with averages and differences normalized with said weight array.

5. A signal enhancement method according to claim 4, wherein said input sampling grid and said output sampling grids are of dimension d=3 and the incoming signal is a video signal.

6. A signal enhancement method according to claim 5, wherein said input sampling grid is an interlaced video sampling grid and said output sampling grid is a progressive grid.

7. A signal enhancement method according to claim 1, wherein for at least one scale, said grouping array in step c is derived from the grouping array at a previous scale by a grouping estimation with block matching.

8. A signal enhancement method according to claim 1, wherein said enhancement process in step d includes thresholdings.

9. A signal enhancement method according to claim 1, wherein said output sampling grid is strictly larger than said input sampling grid.

10. A signal enhancement method according to claim 1, wherein said incoming signal is the output of an approximate inverse operator applied to an input signal.

11. A signal enhancement method according to claim 1, wherein said incoming signal is one of a plurality of incoming subband signals derived by a subband decomposition of an input digital signal, wherein said steps a through e are applied to each of the plurality of incoming subband signals to output respective enhanced subband signals, the method further comprising reconstructing an output enhanced signal by applying an inverse subband decomposition to said enhanced subband signals.

12. A signal enhancement method according to claim 11, wherein said subband decomposition is a wavelet decomposition.

13. A signal enhancement method according to claim 11, wherein said input digital signal is output from an approximate inverse operator applied to an input signal.

14. A signal enhancement method according to claim 1, wherein said input sampling grid and said output sampling grids are of dimension d=3 and the incoming signal is a video signal.

15. A signal enhancement method according to claim 14, wherein said input sampling grid is an interlaced video sampling grid and said output sampling grid is a progressive grid.

16. A signal enhancement method according to claim 1, further comprising transforming an input one-dimensional digital with a time-frequency transform to obtain said incoming signal with d=2, and applying an inverse time-frequency transform to said enhanced digital signal to reconstruct an output enhanced one-dimensional signal.

17. A signal enhancement method for enhancing a plurality of input signals, comprising:
 initializing a plurality of updated signals with said plurality of input signals;
 iteratively computing a plurality of incoming signals each having sample values associated to points of a d-dimensional input sampling grid, d being an integer at least equal to 1, the iterative computation comprising transforming each of said plurality of updated signals with a restoration operator;
 deriving a plurality of enhanced signals by respective applications of a process to each of said plurality of incoming signals; and
 deriving a plurality of output signals from said plurality of enhanced signals when an iteration decision stops the iterations, and otherwise updating said plurality of updated signals with said plurality of enhanced signals.
 wherein said process applied to one of said plurality of incoming signals comprises:
  (a) providing a d-dimensional output sampling grid with an ordering of points of said output sampling grid;
  (b) deriving an average signal defined on said output sampling grid with a sampling grid adjustment applied to said incoming signal;
  (c) iteratively increasing a scale parameter, and for each scale deriving a grouping array, wherein said grouping array associates to each sample of said average signal a match sample located before with respect to said ordering of points of said output sampling grid; and for each scale updating said average signal and deriving a bandelet signal with a redundant grouping lifting;
  (d) computing an enhanced bandelet signal at each scale and an enhanced average signal with an enhancement process applied to said bandelet signal at each scale and to said average signal obtained after the last iteration of step c; and
  (e) iteratively decreasing a scale parameter, and for each scale updating the enhanced average signal with an inverse redundant grouping lifting depending on said enhanced bandelet signal at said scale and outputting the enhanced average signal derived at the end of said iteration as an enhanced digital signal.

18. A signal enhancement method according to claim 17, wherein the iterative computation further comprises applying a subband decomposition to a signal obtained by the transformation with the restoration operator to provide said incoming signal as one of a plurality of incoming subband signals, wherein said steps a through e are applied to each of the plurality of incoming subband signals to output respective enhanced subband signals, the method further comprising applying an inverse subband decomposition to said enhanced subband signals to obtain one of said plurality of enhanced signals.

19. A signal enhancement method according to claim 17, wherein said plurality of input signals are single-stack or multiple-stack seismic signals.

20. A signal enhancement apparatus, comprising circuitry arranged to enhance a digital signal by:
 (a) providing an incoming signal having sample values associated to points of a d-dimensional input sampling grid, d being an integer at least equal to 1, and providing a d-dimensional output sampling grid with an ordering of points of said output sampling grid;
 (b) deriving an average signal defined on said output sampling grid with a sampling grid adjustment applied to said incoming signal;
 (c) iteratively increasing a scale parameter, and for each scale deriving a grouping array, wherein said grouping array associates to each sample of said average signal a match sample located before with respect to said ordering of points of said output sampling grid; and for each scale updating said average signal and deriving a bandelet signal with a redundant grouping lifting;
 (d) computing an enhanced bandelet signal at each scale and an enhanced average signal with an enhancement process applied to said bandelet signal at each scale and to said average signal obtained after the last iteration of step c; and
 (e) iteratively decreasing a scale parameter, and for each scale updating the enhanced average signal with an inverse redundant grouping lifting depending on said enhanced bandelet signal at said scale, and outputting the enhanced average signal derived at the end of said iteration as an enhanced digital signal.

21. A signal enhancement apparatus, comprising circuitry arranged to enhance a plurality of input signals by:
 initializing a plurality of updated signals with said plurality of input signals;
 iteratively computing a plurality of incoming signals each having sample values associated to points of a d-dimensional input sampling grid, d being an integer at least equal to 1, the iterative computation comprising transforming each of said plurality of updated signals with a restoration operator;

deriving a plurality of enhanced signals by respective applications of a process to each of said plurality of incoming signals; and deriving a plurality of output signals from said plurality of enhanced signals when an iteration decision stops the iterations, and otherwise updating said plurality of updated signals with said plurality of enhanced signals, wherein said process applied to one of said plurality of incoming signals comprises:

(a) providing a d-dimensional output sampling grid with an ordering of points of said output sampling grid;

(b) deriving an average signal defined on said output sampling grid with a sampling grid adjustment applied to said incoming signal;

(c) iteratively increasing a scale parameter, and for each scale deriving a grouping array, wherein said grouping array associates to each sample of said average signal a match sample located before with respect to said ordering of points of said output sampling grid; and for each scale updating said average signal and deriving a bandelet signal with a redundant grouping lifting;

(d) computing an enhanced bandelet signal at each scale and an enhanced average signal with an enhancement process applied to said bandelet signal at each scale and to said average signal obtained after the last iteration of step c; and (e) iteratively decreasing a scale parameter, and for each scale updating the enhanced average signal with an inverse redundant grouping lifting depending on said enhanced bandelet signal at said scale, and outputting the enhanced average signal derived at the end of said iteration as an enhanced digital signal.

* * * * *

UNITED STATES PATENT AND TRADEMARK OFFICE
CERTIFICATE OF CORRECTION

PATENT NO. : 8,189,939 B2  Page 1 of 1
APPLICATION NO. : 12/094813
DATED : May 29, 2012
INVENTOR(S) : Stephane Mallat It is certified that error appears in the above-identified patent and that said Letters Patent is hereby corrected as shown below:

In the Claims:

Column 15, Claim 17, Line 58; after the word "signals" replace --.-- with --,--

Signed and Sealed this
Twenty-fifth Day of December, 2012

David J. Kappos
*Director of the United States Patent and Trademark Office*

UNITED STATES PATENT AND TRADEMARK OFFICE
CERTIFICATE OF CORRECTION

PATENT NO.        : 8,189,939 B2
APPLICATION NO.   : 12/094813
DATED             : May 29, 2012
INVENTOR(S)       : Stephane Mallat It is certified that error appears in the above-identified patent and that said Letters Patent is hereby corrected as shown below:

In the Specification:

At column 2, line 40, immediately after the word "which," please insert --the signal has regular variations. Non-linear zoom with geometric interpolations computes such directional interpolations. A motion compensated video deinterlacing performs an interpolation of the missing samples in the direction of the image motion from existing samples in the previous or next images, as in US. Pat. No. 6,421,090. State of the art super-resolution processes perform a directional interpolation with a linear interpolation operator. In presence of noise, such interpolators do not perform an adaptive regularization in order to enhance the signal values, which is necessary to restore good quality high resolution signals.

Bandelet transformation algorithms have been introduced to restore signals by taking advantage of existing geometrical regularity. A bandelet follows the directions in which the signal has regular variations. Its values have a zero average so that the bandelet coefficient obtained by inner product of the signal with a bandelet is most often close to zero. A bandelet transform decomposes a signal into bandelet coefficients that are stored in bandelet signals, and this transform can be inverted. A signal restoration can be efficiently implemented with thresholding operators over the corresponding bandelet signals. In C. Bernard, J. Kalifa, E. Le Pennec and S. Mallat, "Method and apparatus for processing or compressing n-dimensional signals with warped wavelet packets and bandelets", PCT/EP02/14903, 2002, bandelet coefficients are computed by following directions that are locally parallel. This requires to segment the image which is computational expensive, and it does not take into account junctions and corners which limits the restoration quality of these structures. To avoid such segmentations it is needed to introduce a more flexible geometric grouping that does not require to be parallel and which can include meeting points and junctions. This requires to completely modify the process that computes bandelet coefficients.

Accordingly, there exists a need in the art for improving signal enhancement, by introducing a transformation process that takes advantage of existing anisotropic signal geometric regularity, and takes into accounts junctions and corners. There exists also a need to introduce adaptive non-linear Signed and Sealed this
Ninth Day of April, 2013

Teresa Stanek Rea
*Acting Director of the United States Patent and Trademark Office* restoration processes, which preserve sharp discontinuities and remove the noise adaptively in the directions of geometric regularity. For super-resolution there is a need to incorporate a restoration in the super-resolution to obtain a procedure that is robust to noise and distortions.--